United States Patent
Barker et al.

(10) Patent No.: US 10,934,876 B2
(45) Date of Patent: Mar. 2, 2021

(54) BLADE OUTER AIR SEAL AFT HOOK RETAINER

(71) Applicant: United Technologies Corporation, Farmington, CT (US)

(72) Inventors: William M. Barker, North Andover, MA (US); Thomas E. Clark, Sanford, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 503 days.

(21) Appl. No.: 16/038,480

(22) Filed: Jul. 18, 2018

(65) Prior Publication Data

US 2020/0025011 A1  Jan. 23, 2020

(51) Int. Cl.
*F01D 11/08*  (2006.01)

(52) U.S. Cl.
CPC .......... *F01D 11/08* (2013.01); *F05D 2220/32* (2013.01); *F05D 2240/56* (2013.01); *F05D 2240/59* (2013.01); *F05D 2300/6033* (2013.01)

(58) Field of Classification Search
CPC .... F01D 11/08; F01D 25/246; F05D 2220/32; F05D 2240/11; F05D 2240/56; F05D 2240/59; F05D 2260/30; F05D 2260/36; F05D 2300/6033
See application file for complete search history.

(56) References Cited

U.S. PATENT DOCUMENTS

| | | | |
|---|---|---|---|
| 4,759,687 A * | 7/1988 | Miraucourt | F01D 11/08 415/127 |
| 6,200,091 B1 * | 3/2001 | Bromann | F01D 11/18 415/173.1 |
| 6,435,820 B1 | 8/2002 | Overberg | |
| 6,575,697 B1 * | 6/2003 | Arilla | F01D 11/005 415/173.1 |
| 6,726,446 B2 * | 4/2004 | Arilla | F01D 25/246 415/138 |
| 6,932,566 B2 * | 8/2005 | Suzumura | F01D 11/08 415/135 |
| 8,047,773 B2 * | 11/2011 | Bruce | F01D 25/04 415/173.3 |

(Continued)

FOREIGN PATENT DOCUMENTS

FR  2887920 A1  1/2007

OTHER PUBLICATIONS

European Search Report for EP Application No. 19187113.6 dated Dec. 20, 2019.

*Primary Examiner* — Igor Kershteyn
(74) *Attorney, Agent, or Firm* — Carlson, Gaskey & Olds, P.C.

(57) ABSTRACT

A gas turbine engine includes a turbine section including at least one turbine rotor having at least one blade. A blade outer air seal is positioned radially outward of a radially outer tip of the at least one turbine blade. The blade outer air seal has a forward hook and an aft hook. The forward hook is supported on a forward retainer and the aft hook is supported on an aft hook retainer. The aft hook retainer provides structure to prevent rotation of the blade outer air seal relative to the aft hook retainer. There is an interference fit between the aft hook retainer and the forward retainer. A load path is provided from a static structure through the aft hook retainer to the forward retainer.

20 Claims, 5 Drawing Sheets

(56) References Cited

U.S. PATENT DOCUMENTS

| | | | |
|---|---|---|---|
| 10,557,365 B2* | 2/2020 | Crutchfield | F01D 11/08 |
| 2009/0035125 A1* | 2/2009 | Fujimoto | F01D 11/24 |
| | | | 415/116 |
| 2016/0258311 A1 | 9/2016 | Varney et al. | |
| 2016/0290140 A1 | 10/2016 | Thomas et al. | |
| 2016/0326891 A1* | 11/2016 | Roach | F01D 5/282 |
| 2017/0260869 A1 | 9/2017 | Vetters et al. | |

* cited by examiner

BLADE OUTER AIR SEAL AFT HOOK RETAINER

BACKGROUND

This application relates to a retainer for an aft hook of a blade outer air seal.

Gas turbine engines are known and typically include a fan delivering air into a compressor and into a bypass duct. Air in the compressor is compressed and passed into a combustor where it is mixed with fuel and ignited. Products of this combustion pass downstream over turbine rotors, driving them to rotate.

Turbine rotors typically include a plurality of blades extending radially outwardly, which are driven by the products of combustion, and result in the rotation.

Efficiency is becoming increasingly important in gas turbine engine design. Thus, a designer seeks to maximize the flow of the products of combustion across the turbine blades. To this end, blade outer air seals are placed in close proximity to a radially outer periphery of the blades. This maximizes the amount of the products of combustion passing across the blades and limits leakage around the blades.

SUMMARY

In a featured embodiment, a gas turbine engine includes a turbine section including at least one turbine rotor having at least one blade. A blade outer air seal is positioned radially outward of a radially outer tip of the at least one turbine blade. The blade outer air seal has a forward hook and an aft hook. The forward hook is supported on a forward retainer and the aft hook is supported on an aft hook retainer. The aft hook retainer provides structure to prevent rotation of the blade outer air seal relative to the aft hook retainer. There is an interference fit between the aft hook retainer and the forward retainer. A load path is provided from a static structure through the aft hook retainer to the forward retainer.

In another embodiment according to the previous embodiment, the blade outer air seal is formed of one of a ceramic matrix composite, a monolithic ceramic, a metallic material or single crystal material.

In another embodiment according to any of the previous embodiments, the blade outer air seal is formed from laminates.

In another embodiment according to any of the previous embodiments, an aft seal is positioned axially about an axis of rotation of the turbine rotor, and between the static structure and an aft surface of the aft hook retainer. The aft seal and an interference fit is between the static structure and the aft hook retainer to further provide the interference fit between the aft hook retainer and the forward retainer.

In another embodiment according to any of the previous embodiments, the aft hook retainer has an inner ledge to support a radially inner end of the aft hook on the blade outer air seal. Lugs are positioned radially outwardly of the radially inner ledge. The lugs are received in depressions in the aft hook to prevent rotation of the blade outer air seal relative to the aft hook retainer.

In another embodiment according to any of the previous embodiments, a radially outer ledge on the aft hook retainer is received within a space in the forward retainer.

In another embodiment according to any of the previous embodiments, an aft extent of the aft hook on the blade outer air seal is spaced from a forward surface on the aft hook retainer such that the aft hook retainer does not transfer force into the aft hook on the blade outer air seal.

In another embodiment according to any of the previous embodiments, a forward end of the lugs is in contact with a surface on the forward retainer as part of the interference fit.

In another embodiment according to any of the previous embodiments, a forward end of the lugs is in contact with a surface on the forward retainer as part of the interference fit.

In another embodiment according to any of the previous embodiments, the aft seal has a plurality of bristle seals.

In another embodiment according to any of the previous embodiments, a radial seal is positioned between a radially inner surface on the aft hook retainer and a radially outer surface of the blade outer air seal.

In another embodiment according to any of the previous embodiments, an aft seal is positioned axially about an axis of rotation of the turbine rotor, and between the static structure and an aft surface of the aft hook retainer. The aft seal and an interference fit are between the static structure and the aft hook retainer to further provide the interference fit between the aft hook retainer and the forward retainer.

In another embodiment according to any of the previous embodiments, the aft seal has a plurality of bristle seals.

In another embodiment according to any of the previous embodiments, the aft hook retainer has an inner ledge to support a radially inner end of the aft hook on the blade outer air seal. Lugs are positioned radially outwardly of the radially inner ledge. The lugs are received in depressions in the aft hook to prevent rotation of the blade outer air seal relative to the aft hook retainer.

In another embodiment according to any of the previous embodiments, a radially outer ledge on the aft hook retainer is received within a space in the forward retainer.

In another embodiment according to any of the previous embodiments, an aft extent of the aft hook on the blade outer air seal is spaced from a forward surface on the aft hook retainer such that the aft hook retainer does not transfer force into the aft hook on the blade outer air seal.

In another embodiment according to any of the previous embodiments, the aft hook retainer has an inner ledge to support a radially inner end of the aft hook on the blade outer air seal. Lugs positioned radially outwardly of the radially inner ledge. The lugs are received in depressions in the aft hook to prevent rotation of the blade outer air seal relative to the aft hook retainer.

In another embodiment according to any of the previous embodiments, a forward end of the lugs is in contact with a surface on the forward retainer as part of the interference fit.

In another embodiment according to any of the previous embodiments, an aft extent of the aft hook on the blade outer air seal is spaced from a forward surface on the aft hook retainer such that the aft hook retainer does not transfer force into the aft hook on the blade outer air seal.

In another embodiment according to any of the previous embodiments, a radial seal is positioned between a radially inner surface on the aft hook retainer and a radially outer surface of the blade outer air seal.

These and other features may be best understood from the following drawings and specification.

DETAILED DESCRIPTION

Figure 1:
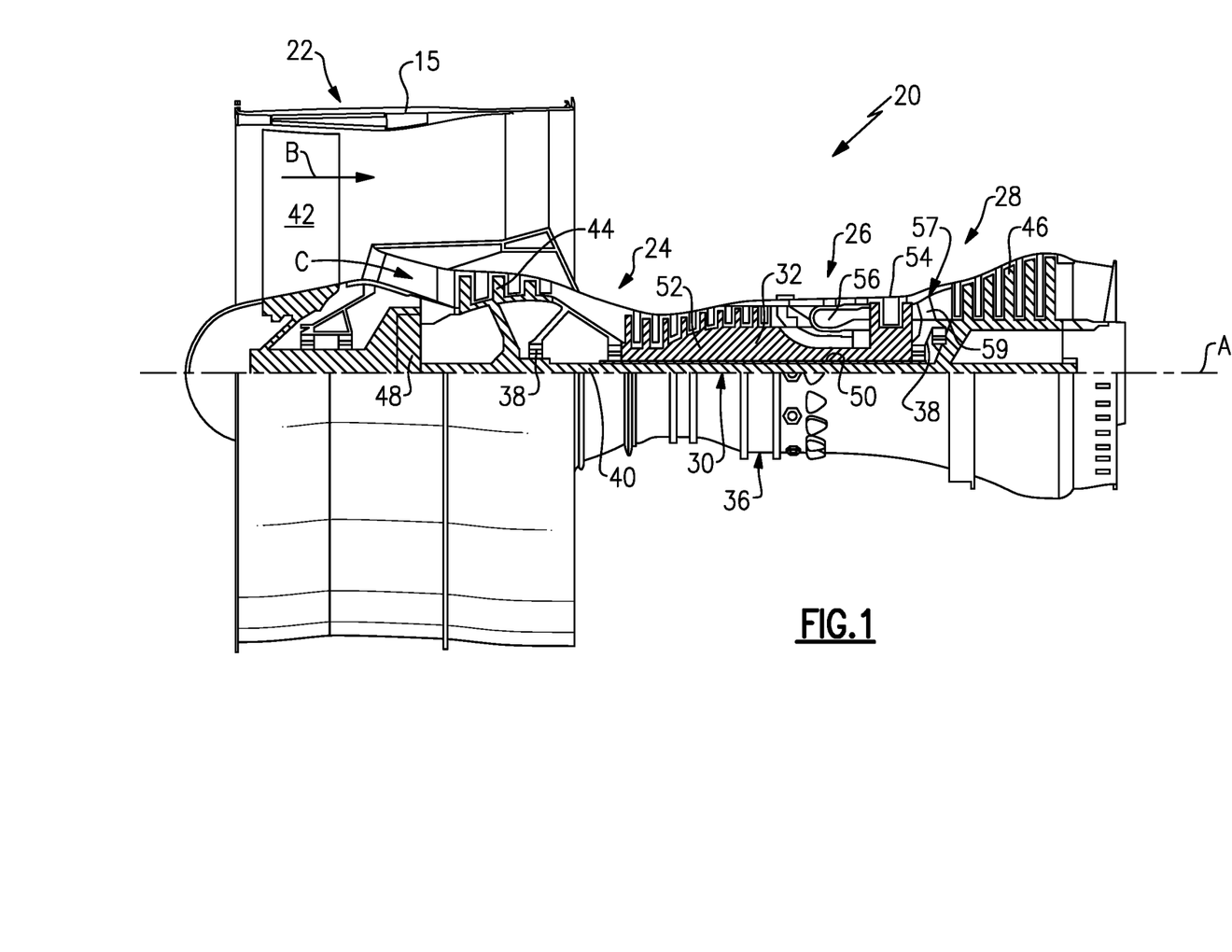
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
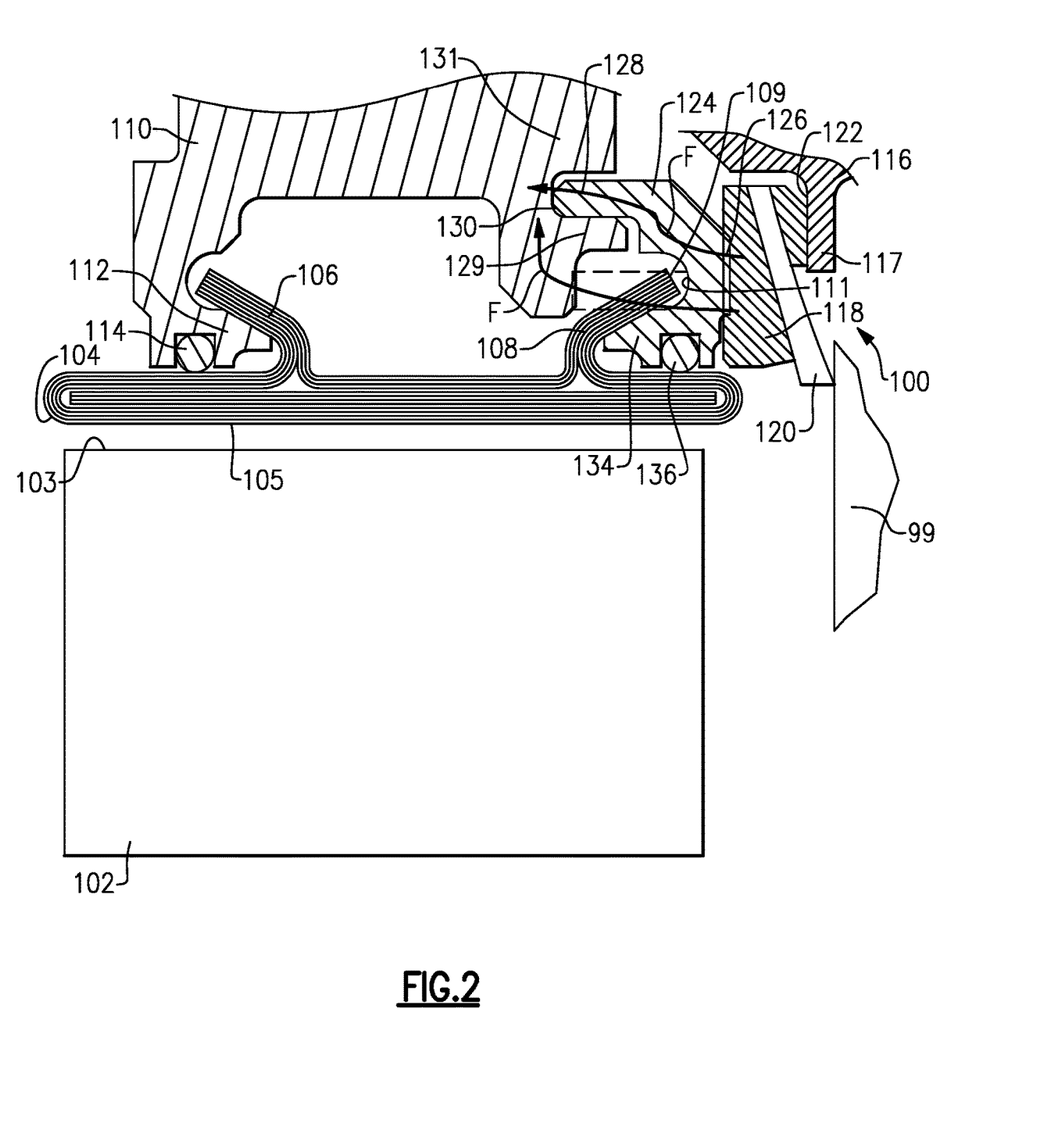
FIG. 2 shows a blade outer air seal assembly.

FIG. 2 shows a section 100 of a turbine, such as may be found in the engine of FIG. 1. Of course, the turbine section 100 could be utilized in other type engines.

A turbine blade 102 is shown schematically and has a radially outer tip 103 closely spaced from a radially inner surface 105 of a blade outer air seal 104 ("BOAS"). The blade outer air seal 104 is shown schematically, but one embodiment is made of a ceramic matrix composite ("CMC") and, as shown, may be formed of a plurality of laminates. While such BOAS have many beneficial characteristics, they also have some challenges. Particularly, CMC BOAS may not have certain mechanical characteristics that a BOAS formed of other materials might have. Thus, it might be desirable that mechanical loads do not pass through the CMC BOAS. Alternatively, the BOAS 104 could be metallic, a monolithic ceramic or formed of a single crystal material.

The BOAS 104 has a forward hook 106 and a rear hook 108. Hook 106 is secured in a forward retainer 110 and on a ledge 112. A seal 114 seals between the forward retainer 110 and the BOAS 104

A rear structural support 116 is fixed to some static structure in an engine and has a finger 117 received tightly against a surface of an aft radial brush seal 118. Aft radial brush seal 118 has seal bristles 120. Bristles 120 abut a downstream turbine vane 99, to resist hot gas ingestion radially outwardly of vane 99.

The aft radial brush seal 118 is held in an interference fit between a surface 122 of the finger 117 and a rear surface 126 of an aft hook retainer 124. Aft hook retainer 124 has an outer ledge 128 received in a space 130 in the forward support 110. Forward support 110 has an inner ledge 129 providing this space 130 along with an outer surface 131. An inner ledge 134 of the aft hook retainer 124 receives and supports the aft hook 108 of the BOAS 104. A seal 136 seals between the aft hook retainer 124 and a radially outer surface on the BOAS 104.

As shown at F, due to the interference fit, a load path for securing the aft end of the BOAS passes through the aft hook retainer 124 to the forward support 110, and not through the hook 108 of the BOAS 104. As shown, there is a space between an aft end 109 of the hook 108 and a forward end 111 of a space receiving the hook 108. This ensures the load path does pass through the BOAS.

Figure 3:
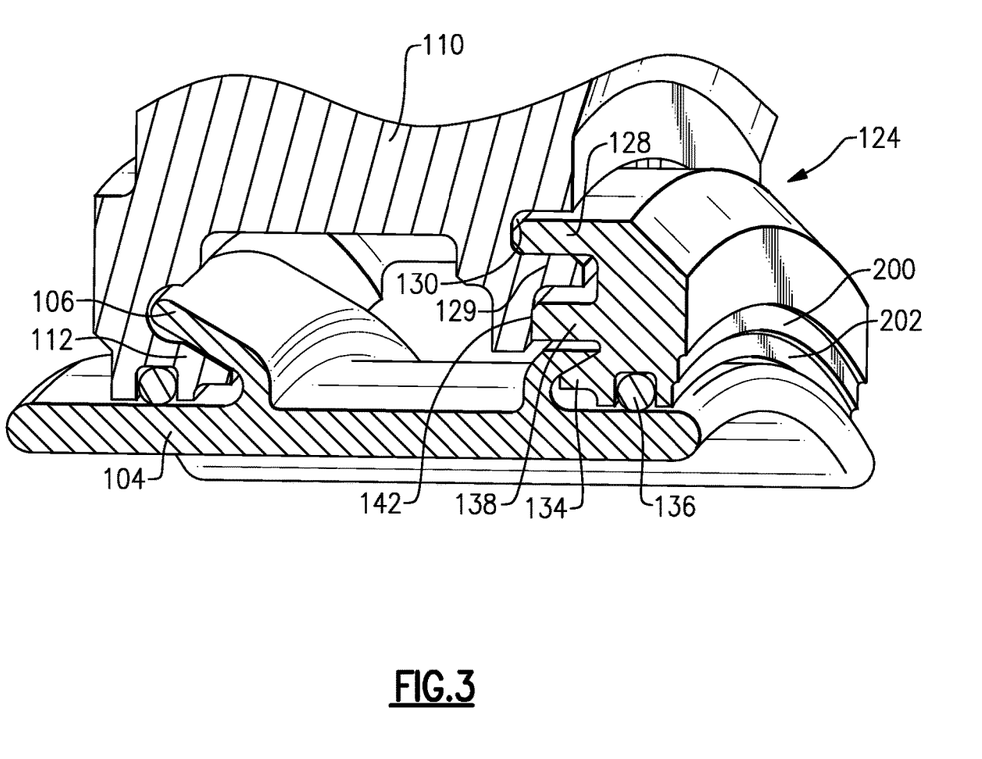
FIG. 3 shows a detail of components from the FIG. 2 assembly.

FIG. 3 shows further details of the forward support 110 and the BOAS 104 and, in particular, the aft hook retainer 124. Features 200 channel the interference load from the brush seal 118 into desirable locations through aft retainer 128. 202 is an aft face of the leg that retains the aft rope seal 136.

Figure 4:
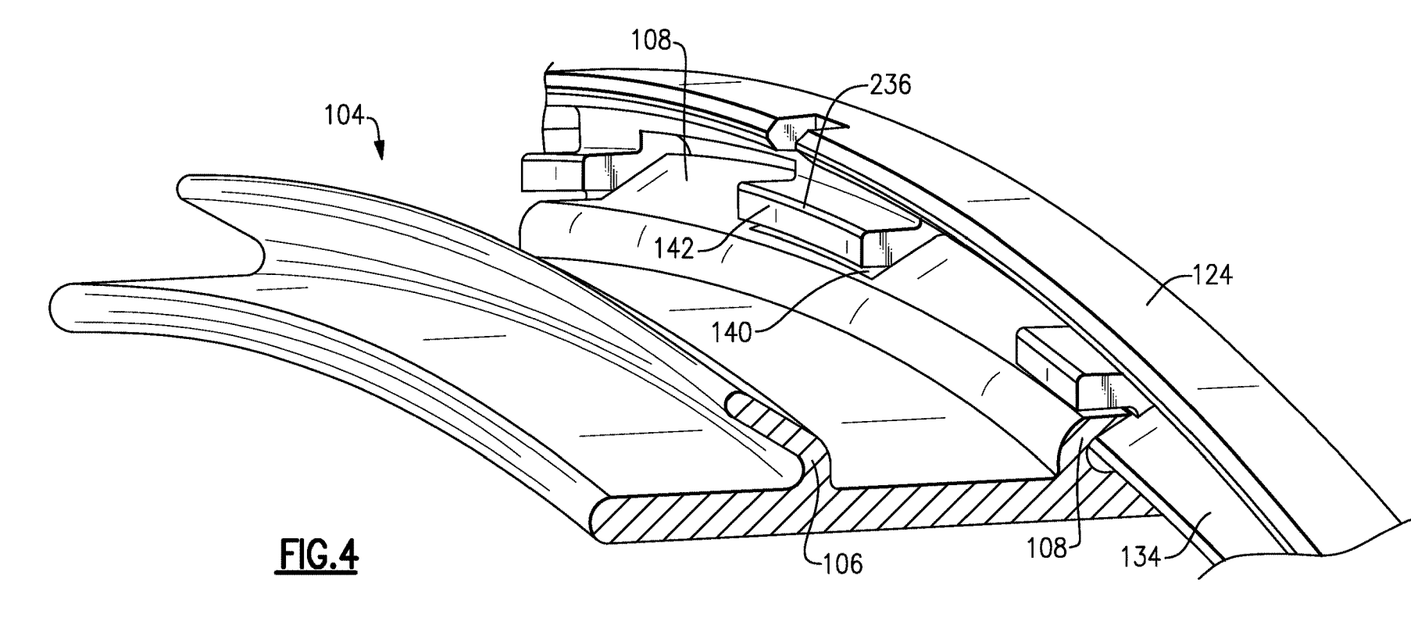
FIG. 4 is another view of several components from FIG. 2.

FIG. 4 shows further details of the aft hook retainer 124 and the BOAS 104. As shown, the hook 108 is formed with indents 140, which receive lugs 236 which are positioned in an opposed radial side of the hook 108 from the inner wedge 134. The lugs 236 received in the recesses 140 provide an anti-rotation function preventing rotation of the BOAS 104.

As known, the BOAS might be circumferentially segmented. However, in at least one embodiment, the aft hook retainer is a full hoop extending for 360° about a central axis of the engine. As can also be appreciated from FIG. 4 and, in particular, taken with FIG. 3, a forward surface 142 on the lug 136 provides a portion of the load path into the forward retainer 110.

Figure 5:
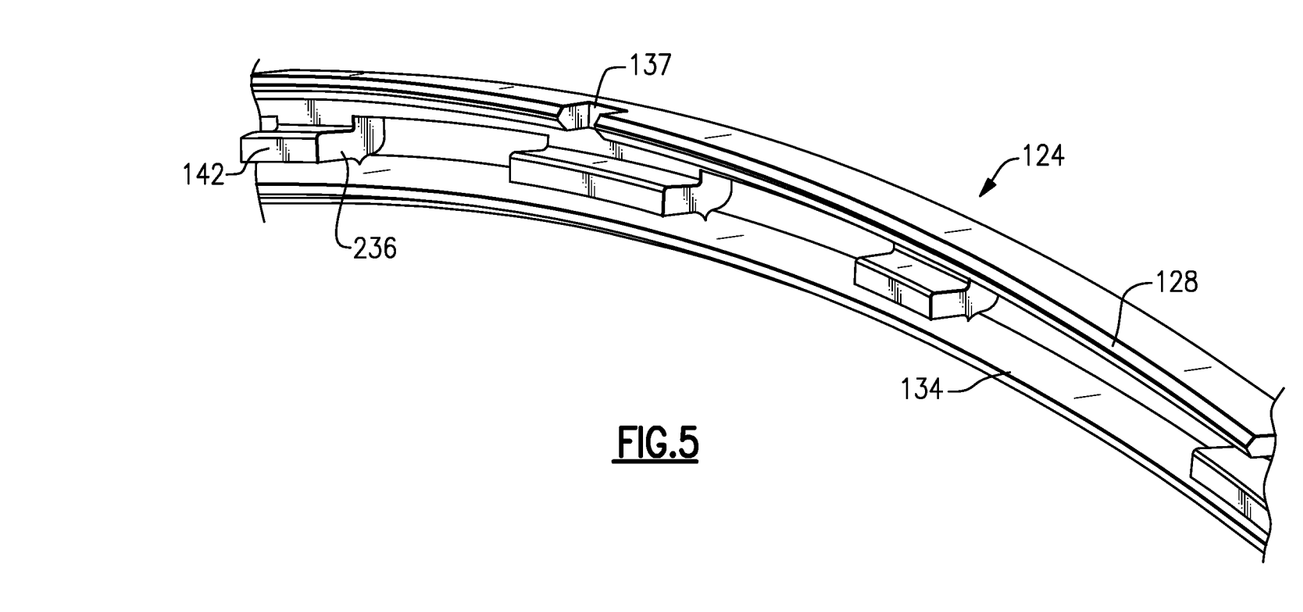
FIG. 5 shows an aft hook retainer.

FIG. 5 shows another view of the aft hook retainer 124. An opening 137 provides an anti-rotation feature for aft hook retainer 124 against forward retainer 110.

The disclosed combination provides a simple assembly of a CMC BOAS. In embodiments, the full hoop aft hook retainer 124 will provide better tip clearance control compared to segmented supports.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a turbine section including at least one turbine rotor having at least one blade;
a blade outer air seal positioned radially outward of a radially outer tip of said at least one turbine blade, and said blade outer air seal having a forward hook and an aft hook, said forward hook supported on a forward retainer and said aft hook supported on an aft hook retainer, said aft hook retainer providing structure to prevent rotation of said blade outer air seal relative to said aft hook retainer, and there being an interference fit between said aft hook retainer and said forward retainer, and a load path being provided from a static structure through said aft hook retainer to said forward retainer; and
wherein an aft seal is positioned axially about and axis of rotation of said turbine rotor, and between said static structure and an aft surface of said aft hook retainer, and said aft seal having an interference between said structure and said aft hook retainer to further provide the interference fit between said aft hook retainer and said forward retainer.

2. The gas turbine engine as set forth in claim 1, wherein said blade outer air seal is formed of one of a ceramic matrix composite, a monolithic ceramic, a metallic material or single crystal material.

3. The gas turbine engine as set forth in claim 2, wherein said blade outer air seal is formed from laminates.

4. The gas turbine engine as set forth in claim 1, wherein a radial seal is positioned between a radially inner surface on said aft hook retainer and a radially outer surface of said blade outer air seal.

5. The gas turbine engine as set forth in claim 1, wherein said aft seal has a plurality of bristle seals.

6. The gas turbine engine as set forth in claim 1, wherein said aft hook retainer having an inner ledge to support a radially inner end of said aft hook on said blade outer air seal, and lugs positioned radially outwardly of said radially inner ledge, said lugs being received in depressions in said aft hook to prevent rotation of said blade outer air seal relative to said aft hook retainer.

7. The gas turbine engine as set forth in claim 6, wherein a radially outer ledge on said aft hook retainer is received within a space in said forward retainer.

8. The gas turbine engine as set forth in claim 7, wherein an aft extent of said aft hook on said blade outer air seal is spaced from a forward surface on said aft hook retainer such that said aft hook retainer does not transfer force into said aft hook on said blade outer air seal.

9. The gas turbine engine as set forth in claim 1, wherein said aft hook retainer having an inner ledge to support a radially inner end of said aft hook on said blade outer air seal, and lugs positioned radially outwardly of said radially inner ledge, said lugs being received in depressions in said aft hook to prevent rotation of said blade outer air seal relative to said aft hook retainer.

10. The gas turbine engine as set forth in claim 9, wherein a forward end of said lugs is in contact with a surface on said forward retainer as part of said interference fit.

11. A gas turbine engine comprising:
a turbine section including at least one turbine rotor having at least one blade;
a blade outer air seal positioned radially outward of a radially outer tip of said at least one turbine blade, and said blade outer air seal having a forward hook and an aft hook, said forward hook supported on a forward retainer and said aft hook supported on an aft hook retainer, said aft hook retainer providing structure to prevent rotation of said blade outer air seal relative to said aft hook retainer, and there being an interference fit between said aft hook retainer and said forward retainer, and a load path being provided from a static structure through said aft hook retainer to said forward retainer; and
wherein an aft extent of said aft hook on said blade outer air seal is spaced from a forward surface on said aft hook retainer such that said aft hook retainer does not transfer force into said aft hook on said blade outer air seal.

12. A gas turbine engine comprising:
A turbine section including at least one turbine rotor having at least one blade;
a blade outer air seal positioned radially outward of a radially outer tip of said at least one turbine blade, and said blade outer air seal having a forward hook and an aft hook, said forward hook supported on a forward retainer and said aft hook supported on an aft hook retainer, said aft hook retainer providing structure to prevent rotation of said blade outer air seal relative to said aft hook retainer, and there being an interference fit between said aft hook retainer and said forward retainer, and a load path being provided from a static structure through said aft hook retainer to said forward retainer; and wherein a radial seal is positioned between a radially inner surface on said aft hook retainer and a radially outer surface of said blade outer air seal.

13. The gas turbine engine as set forth in claim 12, wherein an aft seal is positioned axially about an axis of rotation of said turbine rotor, and between said static structure and an aft surface of said aft hook retainer, and said aft seal having an interference fit between said static structure and said aft hook retainer to further provide the interference fit between said aft hook retainer and said forward retainer.

14. The gas turbine engine as set forth in claim 13, wherein said aft hook retainer having an inner ledge to support a radially inner end of said aft hook on said blade outer air seal, and lugs positioned radially outwardly of said radially inner ledge, said lugs being received in depressions in said aft hook to prevent rotation of said blade outer air seal relative to said aft hook retainer.

15. The gas turbine engine as set forth in claim 14, wherein a radially outer ledge on said aft hook retainer is received within a space in said forward retainer.

16. The gas turbine engine as set forth in claim 15, wherein an aft extent of said aft hook on said blade outer air seal is spaced from a forward surface on said aft hook retainer such that said aft hook retainer does not transfer force into said aft hook on said blade outer air seal.

17. The gas turbine engine as set forth in claim 16, wherein a forward end of said lugs is in contact with a surface on said forward retainer as part of said interference fit.

18. The gas turbine engine as set forth in claim 14, wherein a forward end of said lugs is in contact with a surface on said forward retainer as part of said interference fit.

19. The gas turbine engine as set forth in claim 17, wherein said aft seal has a plurality of bristle seals.

20. A gas turbine engine comprising:
a turbine section including at least one turbine rotor having at least one blade;
a blade outer air seal positioned radially outward of a radially outer tip of said at least one turbine blade, and said blade outer air seal having a forward hook and an aft hook, said forward hook supported on a forward retainer and said aft hook supported on an aft hook retainer, said aft hook retainer providing structure to prevent rotation of said blade outer air seal relative to said aft hook retainer, and there being an interference fit between said aft hook retainer and said forward retainer, and a load path being provided from a static structure through said aft hook retainer to said forward retainer;
wherein said aft hook retainer having an inner ledge to support a radially inner end of said aft hook on said blade outer air seal, and lugs positioned radially outwardly of said radially inner ledge, said lugs being received in depressions in said aft hook to prevent rotation of said blade outer air seal relative to said aft hook retainer; and
wherein a forward end of said lugs is in contact with a surface on said forward retainer as part of said interference fit.

* * * * *